United States Patent Office 2,964,819
Patented Dec. 20, 1960

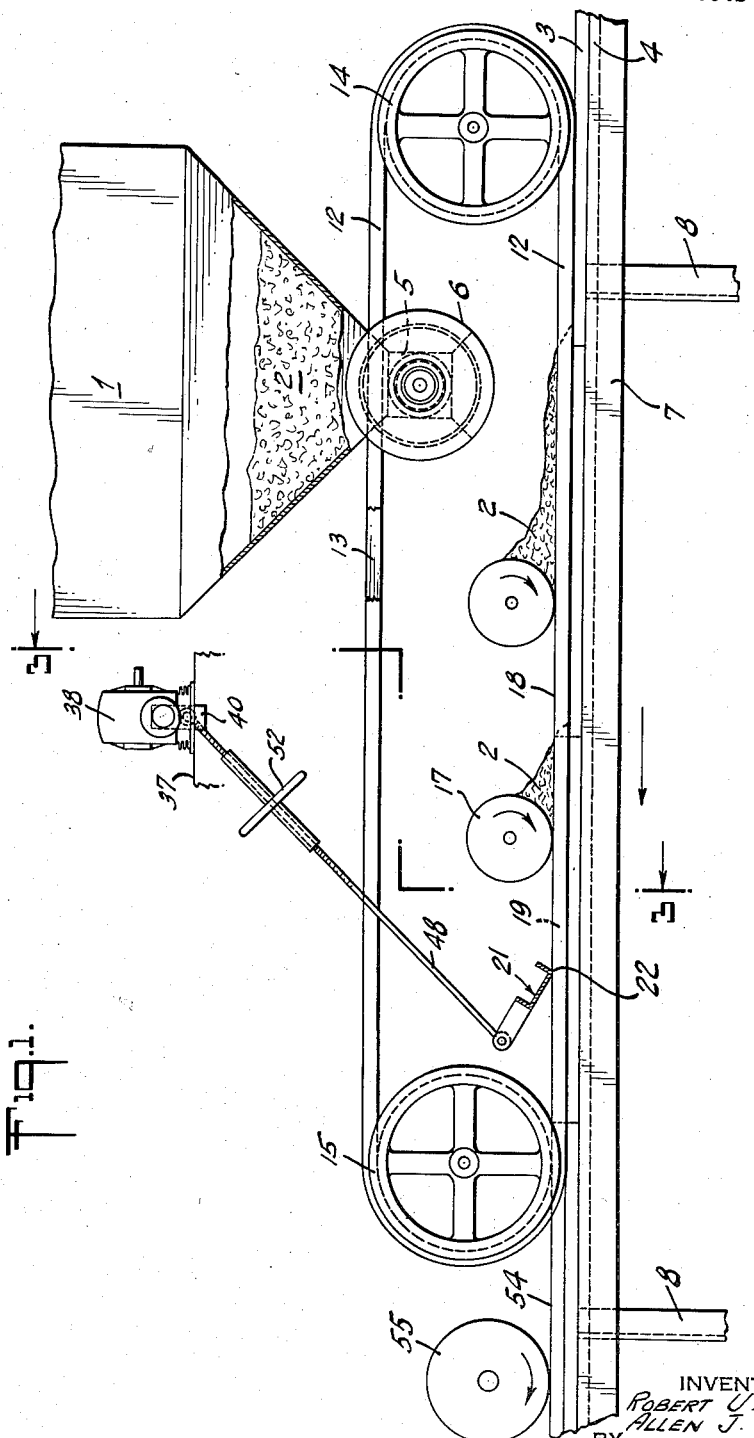

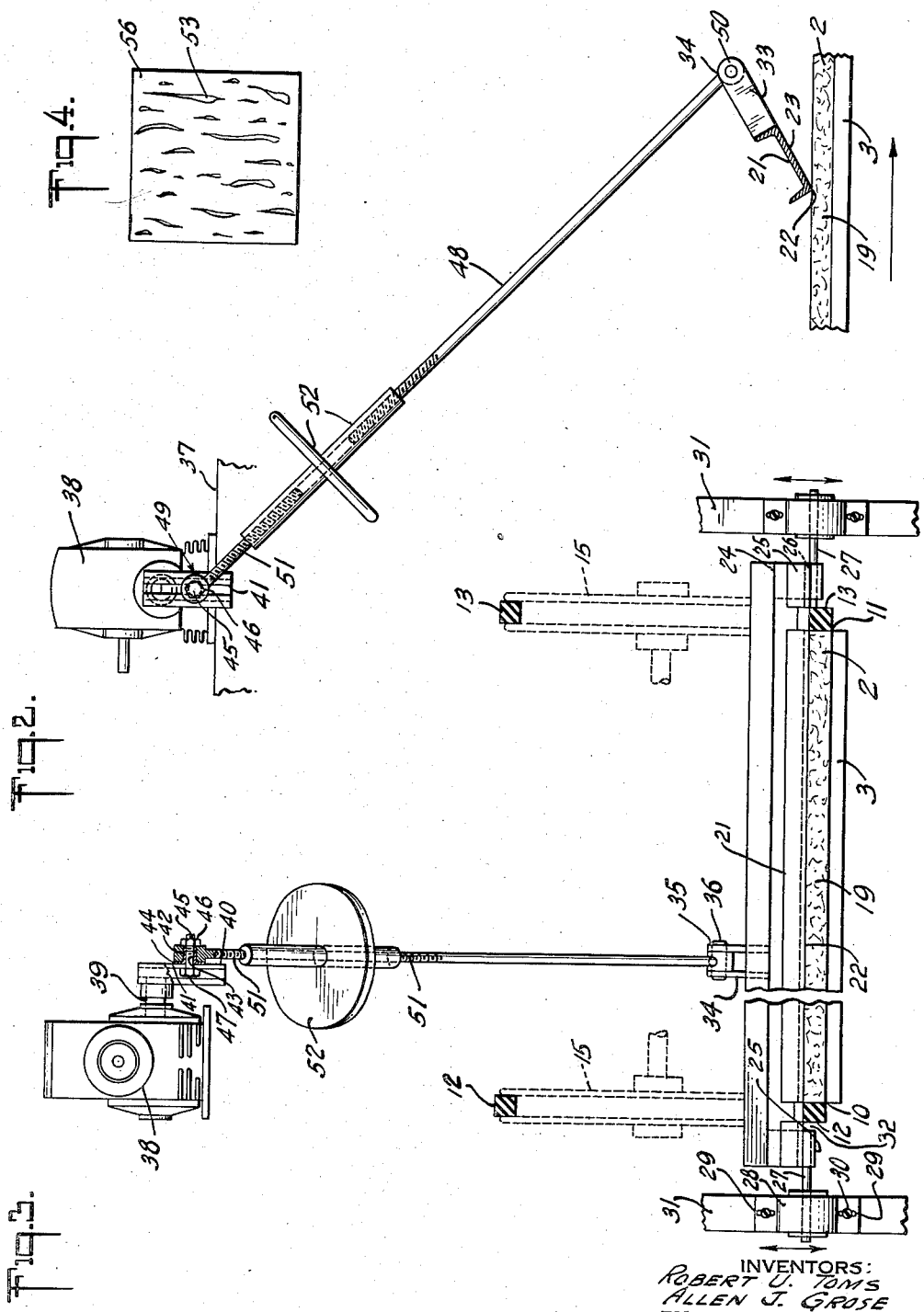

2,964,819

APPARATUS FOR AND METHOD OF FISSURING THE SURFACE OF A MOVING LAYER OF WET FIBROUS MIX CAPABLE OF HAVING FISSURES FORMED THEREIN

Robert U. Toms and Allen J. Grose, Alexandria, Ind., assignors to Johns-Manville Corporation, New York, N.Y., a corporation of New York Filed Aug. 9, 1957, Ser. No. 677,312

8 Claims. (Cl. 25—42)

This invention relates to apparatus for and a method of producing fissures in acoustical panels wherein a flat bar is positioned to drag the surface of a wet mix as it passes beneath the bar which is maintained in continuous oscillation.

It is the primary object of this invention to provide apparatus for and a method of producing fissures in a wet mix of starch and mineral wool which is then processed further into a finished acoustical panel.

The invention will be more fully understood and further objects and advantages thereof will become apparent when reference is made to the following detailed description of a preferred embodiment of the invention and the accompanying drawings in which:

Fig. 1 is a side elevation of the apparatus of the instant invention;

Fig. 2 is an opposite side elevation of the oscillating fissuring bar assembly;

Fig. 3 is a section taken on the plane passing through the line 3—3 of Fig. 1; and Fig. 4 is a top plan view of a fissured acoustical panel.

Referring to the drawing there is disclosed in Fig. 1, a mixing tank 1 in which a wet mix 2 of starch and mineral wool is prepared. Although the invention is disclosed in connection with a wet mix of starch and mineral wool, the apparatus may be used to produce fissures in any type of wet mix used in making building products. A conveyor screen 3 is moved beneath the tank 1 in the direction indicated by the arrows (Figs. 1 and 2) by a conveyor chain 4 attached to a suitable source of power in the usual manner. A rotary feeder 5 regulated by the wheel 6 deposits the wet mix 2 onto the screen 3. A frame 7 having legs 8 supports the apparatus.

Mounted so as to come into contact with the edges 10 and 11 of the screen 3 are a pair of endless belts 12 and 13 which are moved in the same direction and at the same speed as the conveyor screen 3 by the pulleys 14 and 15 connected to a source of power in the usual manner. The belts 12 and 13 are square in cross section and cooperate with the screen 3 to form a mold for the reception of the wet mix 2. A pair of rotating smoothing rollers 16 and 17 are mounted so as to come into contact with the upper surface 18 of the belts. As the wet mix 2 on the screen 3 passes beneath the rollers 16 and 17, it is pressed into the mold formed by the belts 12 and 13 and the screen 3. Thus, a smooth layer 19 of wet mix having a uniform thickness lies on the screen 3 between the belts 12 and 13 after passing under the roller 17.

The apparatus for producing fissures in a wet mix is particularly shown in Figs. 2 and 3. A channel shaped bar 21 is mounted so as to have an edge 22 in position to contact the smooth layer 19 of the wet mix 2. The bar 21 has a flat bottom surface 23 which is set at a predetermined angle to the smooth layer 19. At either end 24, the bar 21 extends beyond the belts 12 and 13 and is provided with depending ears 25 having circular apertures 26 in which are mounted the pivot pins 27. The pins 27 are journaled for rotation in the pillow blocks 28. Slots 29 in the pillow block 28 and screws 30 adjustably secure the block 28 in the desired position on the support 31 so that different thicknesses of wet mix 2 may be acted upon by the bar 21. Recessed portions 32 between the main section of the bar 21 and the ears 25 allow for passage of the belts 12 and 13. The axis of rotation of each pivot pin 27 is parallel to and slightly offset from the edge 22 and passes through the layer 19 of wet mix 2 so that the edge 22 of the bar 21 will move only through a slight arc, as will appear particularly from Fig. 3, indicating the very slight offset, or in other words, the approximate alignment of edge 22 with the pins 27.

The bar 21 is provided with an integral longitudinally extending edge 33 having an upstanding bight portion 34 with apertures 35 in which a pivot pin 36 is secured. Mounted on a fixed support 37 above the bar 21, there is a motor 38 having drive shaft 39. A crank arm 40 having longitudinal T-shaped slot 41 is secured to the shaft 39 for rotation therewith. A pivot pin 42, having a central bore 43 and an enlarged flange 44, is adjustably secured along the crank arm 40. A bolt 45 passes through the bore 43. The pin 42 is secured in position by tightening the nut 46 to frictionally engage the sides of the slot 41 between the flange 44 and the head 47 of the bolt. This mechanism allows for varying the amplitude of oscillation of the fissuring bar 21.

A separable rod 48 is pivotally connected at one end by the frictionless bearing 49 to the pin 42 and at the other end 50 by a similar bearing to the pin 36. The rod 48 is in two sections having oppositely threaded mating ends 51. A turnbuckle 52 joins the ends 51 so that its rotation varies the effective length of the rod 48. Changing the length of the rod 48 regulates the predetermined angle between the surface 23 and the layer 19.

In operation, a wet mix 2 of starch and mineral wool is prepared in the mixing tank 1 and is of a consistency so as to be capable of having fissures formed therein while still in the wet state. The conveyor screen 3 and the belts 12 and 13 are put into motion so that the adjacent parts are moving in the same direction and at the same speed. The wet mix 2 is deposited on the screen 3 between the belts 12 and 13 and is passed beneath the smoothing rollers 16 and 17 to form a layer 19 of uniform thickness. The pillow blocks 28 are adjusted so that the edge 22 makes the desired contact with the wet mix 2. The length of the oscillating rod 48 is fixed so that the lower surface 23 of the bar 21 is at the desired angle to the layer 19 of wet mix 2, and the pivot pin 42 is secured in the crank arm 40 so that the bar 21 oscillates at the desired amplitude. The edge 22 is positioned to drag the top of the layer 19. As the oscillating edge 22 of the bar 21 drags the layer 19 of the wet mix 2, fissures 53 are produced therein, transversely of the layer 19, by the oscillatory movement of the bar 21 and of the edge 22 through the slight arc, the change in angle between the bar 21 and the layer 19 which occurs as the bar 21 oscillates apparently contributing to the fissure formation. However, exactly why the fissures are produced may be theorized in various ways, and an understanding of the theory of operation is not necessary in order to practice the invention successfully. The fissured mix 54 then passes under the surface smoothing roller 55. After curing and cutting, in the usual manner, an acoustal panel 56, as shown in Fig. 4, having fissures 53 therein is produced.

Having thus described the invention in rather full detail, it will be understood that these details need not be strictly adhered to and that various changes and modi-

What we claim is:

1. Apparatus for producing fissures in a substantially level fibrous wet mix carried on a moving conveyor, comprising, a bar having two faces meeting at an angle to form a corner comprising a dragging edge, means supporting said bar for oscillation about an axis extending transversely of said wet mix and its direction of travel on the moving conveyor, with said dragging edge being proximate to alignment with said axis and extending transversely of said wet mix and the direction of travel of said mix and in contact with said wet mix, one of said faces facing upstream of the moving wet mix, and means for imparting oscillations of limited amplitude to said bar about said axis with said edge continuously dragging said wet mix and oscillating at most only slightly thereagainst, and with said one face changing its angular relationship to said travelling wet mix as said bar is oscillated, whereby fissures are formed in the wet mix transversely thereof, extending in the general direction of the length of said dragging edge.

2. Apparatus for producing fissures in a fibrous wet mix carried on a moving conveyor, comprising, a bar having an edge extending transversely of the direction of travel of said wet mix on the moving conveyor, and transversely of the width of said wet mix, said edge being formed by an angular juncture of two faces of said bar, means supporting said bar for oscillation about a pivotal axis extending transversely of said wet mix, with said edge being at most only slightly offset from and parallel to said axis and dragging said wet mix in operation with one of said faces directed upstream of the travelling wet mix and at an angle thereto, and means for imparting oscillations of limited amplitude to said bar about said axis with said edge contacting said wet mix and oscillating at most only slightly, and with said one face changing its angular relationship to said travelling wet mix as said bar is oscillated.

3. Apparatus for producing fissures in a wet mix carried on a moving conveyor, comprising, means providing a surface extending transversely of said wet mix and the direction of travel of said mix on the moving conveyor and forming with said wet mix an angle opening in a direction opposite to the direction of travel of said wet mix, said surface having an edge contiguous to said wet mix and extending transversely thereof and in dragging contact therewith, so that said edge drags said wet mix as it travels past said edge, means supporting said surface and edge in the defined arrangement for oscillation of said surface about a pivotal axis also extending transversely of said wet mix to vary the opening of said angle and for at most only slight oscillation of said edge in dragging contact with said wet mix, and means for imparting such oscillations to said surface and said edge, whereby fissures are formed transversely of said wet mix.

4. Apparatus as defined in claim 3, wherein said oscillating means comprises a motor, a crank arm rotated by said motor, a pin adjustably secured along said crank arm and a rod pivotally connected to said pin and said means providing said surface, so that the amplitude of the oscillation of said means providing said surface may be controlled.

5. Apparatus as defined in claim 4, further comprising adjustable means on said rod for adjustment of the effective length of the rod and thereby the angular relationship of said surface to said wet mix.

6. Apparatus for producing fissures in a wet mix comprising, a conveyor, means for moving said conveyor, means for feeding the wet mix unto said conveyor, means for leveling said wet mix into a substantially smooth uniform layer, flat bar means providing a surface extending transversely of said wet mix and its direction of travel and forming with said wet mix an angle opening in a direction opposite to the direction of travel of said wet mix, said surface having an edge contiguous to said wet mix and extending transversely thereof and in dragging, substantially line contact therewith, so that said edge drags said wet mix as it travels past said edge, means supporting said surface and edge in the defined arrangement for oscillation of said surface about a pivotal axis also extending transversely of said wet mix to vary the opening of said angle and for at most only slight oscillation of said edge in dragging contact with said wet mix, means for imparting such oscillations to said surface and said edge, whereby fissures are formed transversely of said wet mix, and means for smoothing the fissured surface of the wet mix without destroying the fissures.

7. A method of producing fissures in a surface of a fibrous wet mix of a consistency capable of having fissures formed in said surface comprising the steps of providing a layer of fibrous wet mix on a moving conveyor, leveling the upper surface of said fibrous mix to provide a relatively smooth upper surface therefor, dragging the smoothed surface of said fibrous mix continuously with a bar having a surface facing at an acute angle upstream of said moving mix and also having a relatively sharp edge on said surface in continuous dragging contact therewith, and imparting slight oscillations to said bar while maintaining continuous dragging contact of the edge with the upper surface of the mix to displace portions of said surface of the fibrous mix thereby forming the fissures therein.

8. A method of producing fissures in the surface of a fibrous wet mix of a consistency capable of having fissures formed in said surface utilizing a relatively flat bar having a surface with an edge contiguous therewith comprising the steps of depositing a layer of wet fibrous mix on a moving conveyor, smoothing the uppermost surface of said conveyed wet mix, placing the bar transversely of said moving mix and with said surface facing upstream of the moving mix and at an angle thereto and with the edge in dragging contact with the surface of the mix, imparting oscillations to the bar about an axis spaced slightly from the edge while maintaining dragging contact of the edge with the upper surface of the mix, and varying the angle that said surface of the bar makes with the uppermost surface of the moving mix during oscillations of the bar to displace portions of said surface of the mix during the varying of said angle.

References Cited in the file of this patent

UNITED STATES PATENTS

| | | |
|---|---|---|
| 1,100,989 | Reagan | June 23, 1914 |
| 1,454,731 | Francis | May 8, 1923 |
| 1,580,153 | Neher | Apr. 13, 1926 |
| 2,015,084 | McQuade | Sept. 24, 1935 |
| 2,245,426 | Baker | June 10, 1941 |
| 2,458,564 | Cooper | Jan. 11, 1949 |
| 2,650,408 | Agar | Sept. 1, 1953 |
| 2,756,459 | Kellner | July 31, 1956 |